(12) United States Patent
Sherry et al.

(10) Patent No.: US 9,002,824 B1
(45) Date of Patent: Apr. 7, 2015

(54) QUERY PLAN MANAGEMENT IN SHARED DISTRIBUTED DATA STORES

(75) Inventors: Gavin Sherry, San Mateo, CA (US); Radhika Reddy, Foster City, CA (US); Caleb E. Welton, Foster City, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 350 days.

(21) Appl. No.: 13/529,501

(22) Filed: Jun. 21, 2012

(51) Int. Cl.
*G06F 7/00* (2006.01)
*G06F 17/00* (2006.01)
*G06F 17/30* (2006.01)

(52) U.S. Cl.
CPC ................................ *G06F 17/30371* (2013.01)

(58) Field of Classification Search
CPC .................... G06F 17/30607; G06F 17/30303; G06F 17/30569; G06F 17/30575; G06F 17/30893; G06F 17/30902
See application file for complete search history.

(56) References Cited

U.S. PATENT DOCUMENTS

| | | | | |
|---|---|---|---|---|
| 6,081,801 | A * | 6/2000 | Cochrane et al. | 1/1 |
| 2006/0159325 | A1 * | 7/2006 | Zeineh et al. | 382/128 |
| 2007/0294319 | A1 * | 12/2007 | Mankad et al. | 707/204 |
| 2011/0302583 | A1 * | 12/2011 | Abadi et al. | 718/102 |
| 2012/0197868 | A1 * | 8/2012 | Fauser et al. | 707/714 |

* cited by examiner

*Primary Examiner* — Susan Chen
(74) *Attorney, Agent, or Firm* — Fish & Richardson P.C.

(57) ABSTRACT

The invention identifies and caches query plans in a shared-nothing distributed data store that are unlikely to become invalid because they do not reference objects that are likely to be changed or deleted. Plans that are likely to become invalid and are not cached are those plans that reference data that is partitioned across segment/query execution nodes of the data store, plans that are complex, and plans that reference objects that are not "built-in" (primitive) objects. The effect is that most plans which are generated on a query dispatch (master) node are not cached, whereas most plans generated on an execution (segment) node are cached.

15 Claims, 3 Drawing Sheets

QUERY PLAN MANAGEMENT IN SHARED DISTRIBUTED DATA STORES

BACKGROUND

This invention relates generally to query plan caching, and more particularly to query plan cache management in shared-nothing distributed data stores.

In query-based shared data stores, typical evaluation of a query involves parsing, rewriting, planning and then executing the query. For many queries, the parsing, rewriting and planning operations are the most costly, and consume a significant portion of the total run time of the query. Caching query plans allows a shared-nothing data store to skip these operations for plans which have already been generated the next time the queries are run, thereby reducing execution times and costs, and improving performance. Caching is particularly effective for queries involving repetitive operations on the same resources.

However, problems arises in a busy shared-nothing data store in insuring that only plans that are likely to remain valid are cached, and in insuring that the plan cache contains only valid plans. If a query plan involves transient objects that change or disappear, or if conditions at the time a query plan is re-executed are different from the conditions at the time the plan was generated, a runtime error will result when the plan is reused. The longer a plan is cached, the more likely it is to become invalid because of changes. There is no cost-effective way of easily determining which plans have become invalid and should be removed from cache. One previous approach to addressing this problem was to register all objects, and then track the objects so that when an object was removed or changed, a corresponding plan could be invalidated. However, this is costly and complex to implement, and tracking transient objects is expensive. This problem is even more challenging in a shared-nothing distributed data store environment where plans are cached in a distributed fashion, the caches on all nodes must remain synchronized, and all nodes must make the same decision upfront about caching a plan that may possibly become invalid. Presently, there is no simple and effective way to accomplish this.

There is a need for addressing the foregoing and other problems of plan cache management, and in particular, for strategically identifying in a shared-nothing distributed data store environment which plans have a higher probability of becoming invalid and should not be cached, and for determining which plans are likely to remain valid and should be cached to improve performance. It is to these ends that the present invention is directed.

DESCRIPTION OF PREFERRED EMBODIMENTS

The invention is particularly well adapted for managing query plan caches in shared nothing distributed data stores, and will be described in that context. It will be appreciated, however, that the invention has applicability to other types of data stores and in other contexts.

Figure 1:
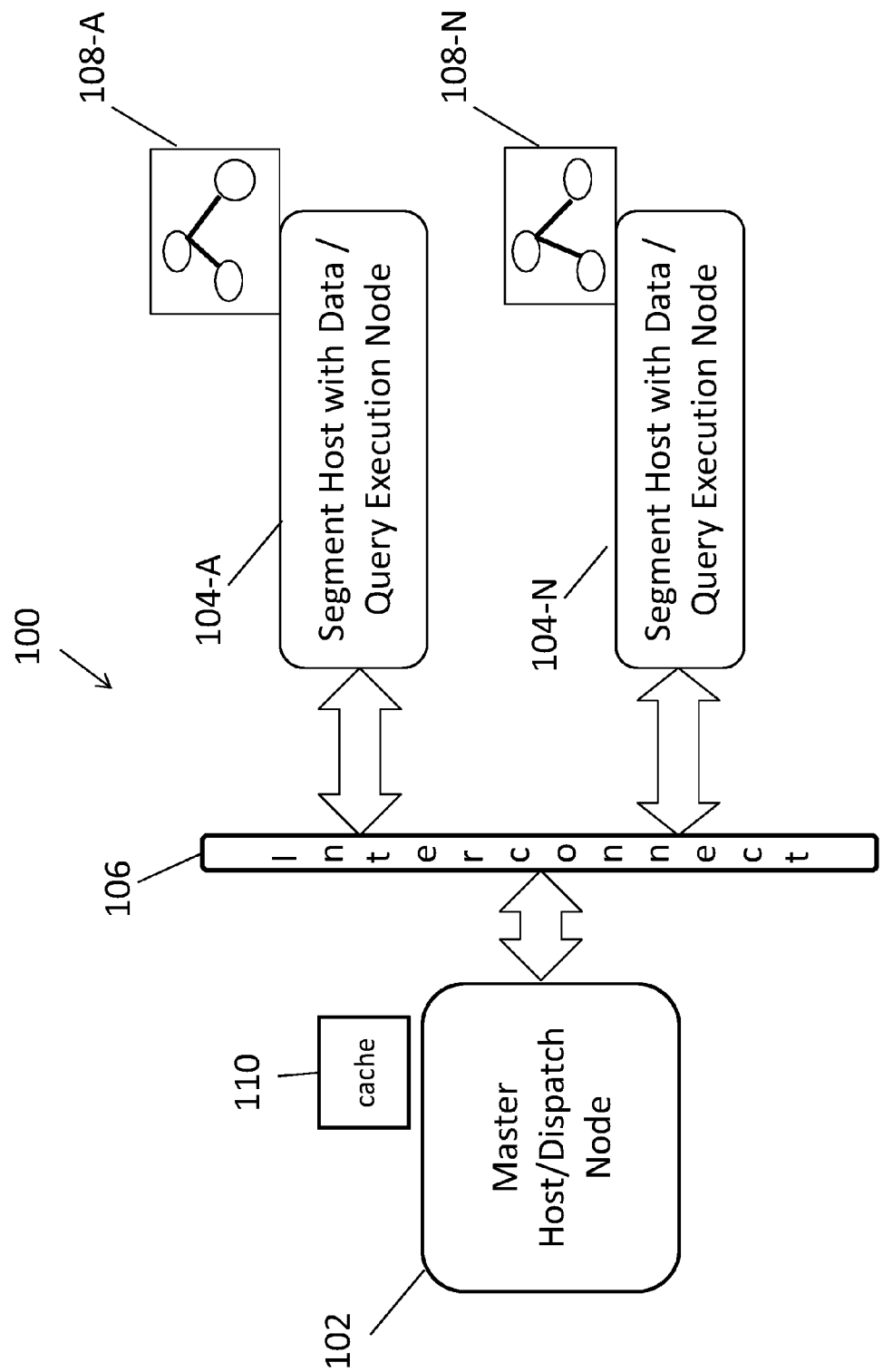
FIG. 1 is a diagrammatic view of a shared-nothing distributed data store of the type with which the invention may be employed.

FIG. 1 illustrates the architecture of a shared-nothing distributed data store (system) 100 of the type with which the invention may be employed. A distributed shared-nothing data store may comprise a master node 102 and a plurality of distributed segment nodes 104-A through 104-N, all of which may be part of a wide area or a local area network. The master and segment nodes may communicate over a network interconnect 106. In general, data in the shared-nothing distributed data store 100 is distributed across the query execution nodes 104-A, 104-N. The data may be partitioned such that each segment node has a small part of the data hosted by the system, or the data may be mirrored such that all nodes which have a copy the data have an exact copy. Master node 102, which is also referred to as a "dispatch node" may receive queries from users, generate query plans, and dispatch instructions to the plurality of segment nodes 104-A, 104-N for execution of the queries. The segment nodes 104-A, 104-N, which are also referred to as "query execution nodes", each receives and executes the queries dispatched from the master node in its own local private data store 108-A, 108-N, and returns the results to the master node. The segment nodes are self sufficient, operate independently of one another, and do not share system resources. The master/query dispatch node may generate query plans that contain references to partitioned data. The segment/query execution node may not.

The master node 102 may have a cache 110 in which it stores query plans that it generates and dispatches to the segment nodes for execution. Each segment node 104-A, 104-N may also generate local query plans for use with its corresponding local data store 108-A, 108-N, and have a local cache (not shown in FIG. 1) for caching its locally generated query plans.

Figure 2:
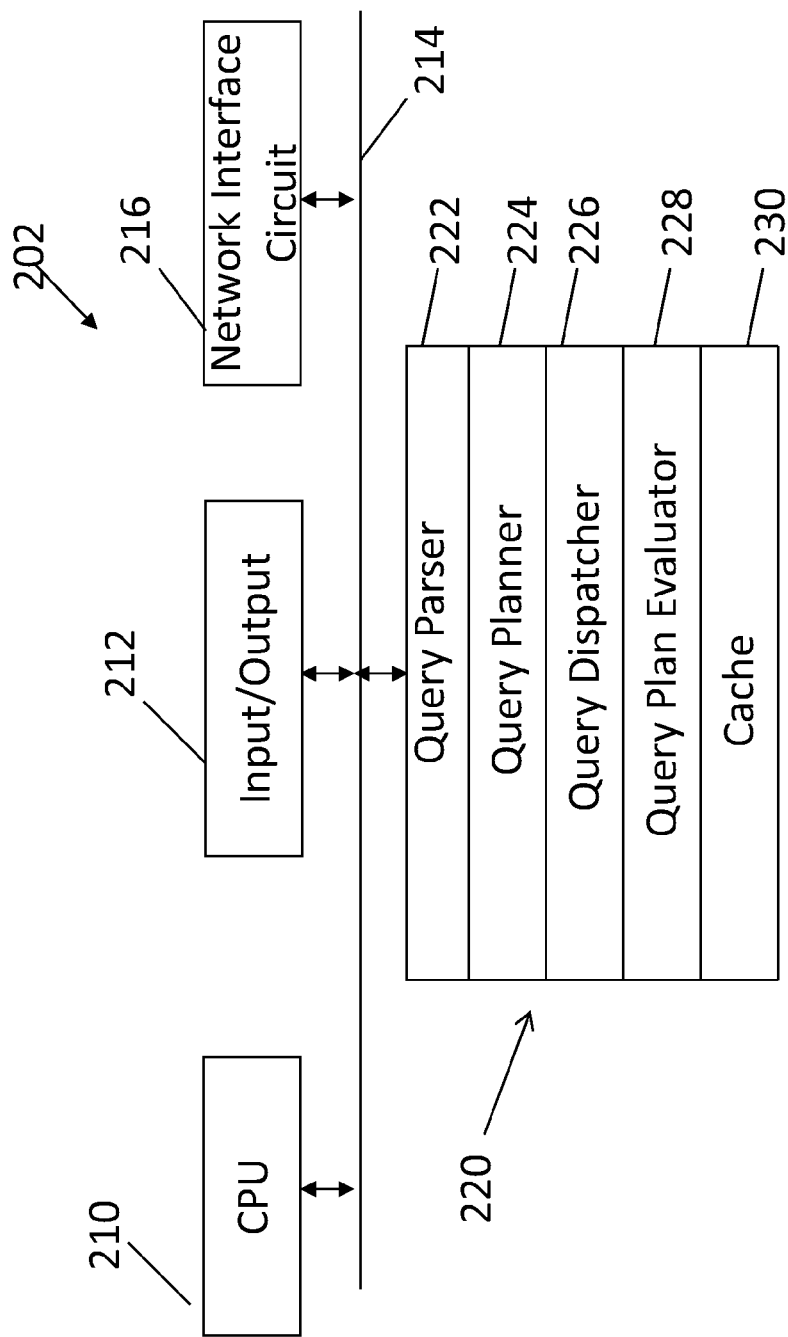
FIG. 2 is a block diagram illustrating the architecture of a node of the shared-nothing distributed data store of FIG. 1.

FIG. 2 illustrates an embodiment of the master node 202 of the data store 100 of FIG. 1. The master node is configured to implement operations in accordance with the invention. The master node 202 may include standard components, such as one or more CPUs 210 that are attached to input/output devices 212 via a bus 214. The input/output devices 212 may include standard components, such as a keyboard, mouse, display, printer and the like. A network interface circuit 216 is also connected to the bus 214, allowing the master node 202 to operate in a networked environment.

A memory 220 is also connected to the bus 214. Memory 220 may comprise physical computer readable storage media for storing executable instructions that control the CPU to operate in accordance with the invention, as will be described, and may contain storage 224 for storing, among other things, program instructions to implement embodiments of the invention. These include, for example, a query parser 222, a query planner 224, a query dispatcher 226 and a query plan evaluator. The memory additionally includes a cache 230 for caching selected query plans.

The query parser 222 interprets a database query from a user (not shown), checks for correct syntax, and builds a data structure (e.g., a tree) to represent the query.

The query planner or query optimizer 224 processes the output from the query parser and develops a query plan to execute the query. A query plan specifies a set of steps that are used to access or modify the data associated with the query. Details, such as how to access a given data relation, in which order to join data relations, sort orders, and so on, may form part of a query plan. For a given query, a large number of query plans may be generated by varying different constituents of the query plan, such as access paths, join methods, join predicates, and sort orders. A typical data store query may produce several hundred or millions of possible execution plans. The cost of a query plan can be modeled in terms of various parameters, including, for example, the number of disk accesses and the response time required for execution. The query optimizer may evaluate the costs of all possible query plans for a given query and determine the optimal, i.e., most efficient, plan for executing the query.

Once a query plan is selected, it is passed to the query dispatcher 226. The query dispatcher 226 dispatches the query plan to a set of the distributed segment (query execution) nodes for execution. The segment nodes may compile some statements in a received query plan and generate their own local query plans for executing these statements. Accordingly, the segment nodes may have an architecture that is similar to the architecture of the master node shown in FIG. 2, and may include executable program instructions for a query plan evaluator such as 228 of the master node to perform the plan evaluation operations in accordance with the invention.

The query plan evaluator 228 operates in accordance with the invention, as will be described, to evaluate query plans and determine which plans should be cached and which should not be cached, and caches the selected plans in cache 230.

As will be described in more detail below, the invention provides systems and methods for identifying query plans that have a high probability of becoming invalid and should not be cached, and for determining which plans are likely to remain valid and should be cached. Each of the master and segment nodes operates in accordance with the invention to strategically select and cache query plans. In particular, the invention affords an easily implemented and applied methodology comprising a set of rules for determining, for a given workload, which query plans to cache and which not to cache. The invention has been found to be very effective in reducing the number of runtime errors due to invalid cache plans.

Generally, the invention identifies plans to be cached by determining the likelihood of objects associated with the plans becoming invalid, which is based, in part, on the complexity of the plans. Generally, plans generated at the master node are seldom cached, with some exceptions, whereas plans generated at the segment nodes are usually always cached. The reason is that plans generated at the master node usually involve functions or statements that must access data objects across the entire distributed set of segment nodes, or the plans tend to be complex, and the likelihood of the objects referenced by these plans becoming invalid is high. In contrast, query execution segment nodes cannot access data that is partitioned across other segment nodes, but, rather, access data only on their local data stores and have a much more limited view of the database cluster. The segment nodes only compile those statements in a received query plan that do not need to access data on other nodes. Thus, the plans generated on the segment nodes tend not to be complex, and the risk of encountering runtime errors with plans generated on the master node is higher than with plans generated on the segment nodes. Additionally, the time required to execute a query plan is generally much greater than the time required to create it. Therefore, there is less benefit to caching a plan that is generated on the master node that has a higher likelihood of becoming invalid.

Figure 3:
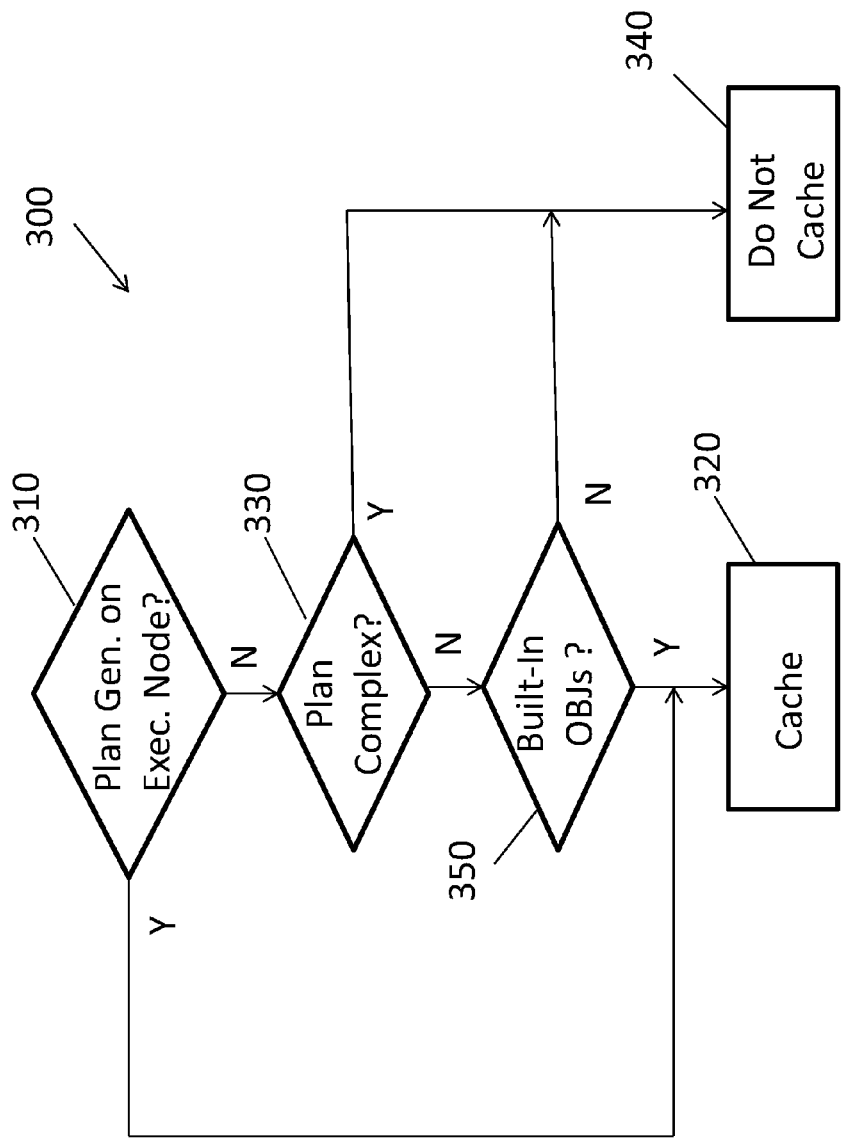
FIG. 3 illustrates a method in accordance with the invention for plan cache management.

FIG. 3 is a flowchart illustrating an overview of a method in accordance with an embodiment of the invention for determining which query plans to cache. Initially at 310, it is determined whether a query plan was generated at the master node or at a query executing node. For the reasons explained above, if the plan were generated at a query executing node, it will usually be cached, and a decision is made to cache the plan at 320, as shown in the figure. If at 310 the plan was not generated at a query executing node but rather on the master node, the complexity of the plan is estimated at 330. This may be done in several ways. Query plans have a structure that is analogous to a tree of nodes (leaves) at different levels. The more complex a plan is, the more levels and leaves it has. Thus, a plan may be assigned an order of complexity, Op, which is determined by the number of leaves in the plan tree. If Op is greater than a preselected user configurable number, n, (i.e., Op>n), the plan may be deemed to be sufficiently complex that is it is likely to be invalidated. Accordingly, a decision is made at 330 to not cache the plan at 340.

Next, if the plan passes the complexity test at 330, the plan is inspected at 350 to determine whether it contains or does not contain built-in objects. Built-in objects are those primitive objects that are registered in the data store system at initialization time, and which cannot be removed or altered without causing an undefined state. They may include, for example, definitions of data types, fundamental operations such as for converting textual representations to binary representations, functions for accessing substrings, and the like. Plans having built-in objects are unlikely to be invalidated. Accordingly, a decision is made at 350 to cache those plans that contain built-in objects. Conversely, if the plan has objects that are not built-in objects, the plan is not cached. To optimize the search for objects that are not built-in objects, the invention preferably uses a depth first search approach since objects that are not built-in are most likely at the leaves of the plan tree structure.

The effect of the process illustrated in FIG. 3 is, as indicated above, that practically all plans generated query execution nodes are cached, whereas plans generated on the master/query dispatch node are not cached unless they are simple plans, plans primarily containing built-in objects, or are plans concerning metadata.

In an alternative embodiment, instead of automatically caching all plans generated on a segment node, plans generated on a segment node may be subjected to a complexity test such as described in connection with step 330 and/or to a built-in object test as described in connection with step 350.

It may be appreciated from the foregoing, plan caching in accordance with the invention may greatly improve the performance of short runtime, real-time queries. For long running queries, the time for parsing, rewriting and planning queries is small compared to their execution times so that the benefits of plan caching relative to cached plan invalidation may not be realized.

An embodiment of the invention affords a computer storage product comprising computer readable physical (non-transitory) storage medium storing the workflow framework as executable instructions for controlling the operations of a computer to perform the processing operations described herein. The computer readable medium may be any standard well known storage media, including, but not limited to magnetic media, optical media, magneto-optical media, and hardware devices configured to store and execute program code, such as application-specific integrated circuits (ASICs), programmable logic devices, and semiconductor memory such as ROM and RAM devices.

While the foregoing has been with reference to preferred embodiments of the invention, it will be appreciated by those skilled in the art that changes to these embodiments may be made without departing from the principles and spirit the invention, the scope of which is defined in the appended claims.

The invention claimed is:

1. A method, comprising:

obtaining a query plan by a data store system having a master node and a plurality of segment nodes, each node of the data store system comprising a respective processor and a respective non-transitory storage medium, wherein the master node is a query distributing node, and each segment node is a query executing node;

determining, by the data store system, a likelihood of the query plan becoming invalid, comprising:

determining whether the query plan was generated on the master node or on a segment node of the data store system;

upon determining that the query plan was generated on a segment node, designating the likelihood as low; and upon determining that the query plan was generated on the master node, performing actions comprising:

determining an estimated complexity value representing an order of complexity of the query plan and designating the query plan as complex or not complex based on the complexity value, wherein more objects being referenced by the query plan correspond to a higher complexity value;

upon designating the query plan as complex, designating the likelihood as high; and upon designating the query plan as not complex, performing actions comprising:

determining whether the query plan contains one or more objects that are different from built-in objects; and upon determining that the query plan contains one or more objects that are different from built-in objects, designating the likelihood as low, otherwise designating the likelihood as high; and caching the query plan upon determining that the likelihood of the query plan becoming invalid is low.

2. The method of claim 1, wherein said determining the complexity value for the query plan is based on a tree-type data structure of the query plan, the tree-type data structure comprising levels and leaves, wherein more levels and leaves correspond to a higher order of complexity value.

3. The method of claim 1, wherein designating the query plan as complex occurs when the complexity value is higher than a preselected, user-configurable number.

4. The method of claim 1, wherein said built-in objects comprise objects registered in the system upon initialization and objects that cannot be removed or altered without causing an undefined state of the system.

5. The method of claim 1, wherein said caching comprises storing the query plan in the storage medium of the master node or in the storage medium of a segment node of the data store system.

6. The method of claim 1, wherein said query plan has a tree-type data structure where objects occupy leaf positions in said tree-type data structure, and said determining whether the query plan contains one or more objects that are different from built-in objects comprises searching for objects that are not built-in beginning at said leaf positions.

7. The method of claim 1 further comprising excluding query plans that contain references to data partitioned across said segment nodes from the caching.

8. The method of claim 1, wherein said caching comprises caching a query plan generated by the master node and concerning metadata.

9. Computer readable non-transitory storage medium product storing executable instructions for causing one or more computers to perform operations comprising:

obtaining a query plan by a data store system having a master node and a plurality of segment nodes, each node of the data store system comprising a respective processor and a respective non-transitory storage medium, wherein the master node is a query distributing node, and each segment node is a query executing node;

determining, by the data store system, a likelihood of the query plan becoming invalid, comprising:

determining whether the query plan was generated on the master node or on a segment node of the data store system;

upon determining that the query plan was generated on the segment node, designating the likelihood of the query plan becoming invalid as low; and upon determining that the query plan was generated on the master node, performing actions comprising:

determining an estimated complexity value representing complexity of the query plan and designating the query plan as complex or not complex based on the complexity value, wherein more objects being referenced by the query plan correspond to a higher complexity value;

upon designating the query plan as complex, designating the likelihood as high; and upon designating the query plan as not complex, performing actions comprising:

determining whether the query plan contains one or more objects that are different from built-in objects; and upon determining that the query plan contains one or more that are different from built-in objects, designating the likelihood of the query plan becoming invalid as low, otherwise designating the likelihood of the query plan becoming invalid as high; and caching the query plan upon determining that the likelihood of the query plan becoming invalid is low.

10. The computer readable product of claim 9, wherein designating the query plan as complex occurs when the complexity value is higher than a preselected, user-configurable number.

11. The computer readable product of claim 10, wherein said plan has a tree-type data structure where objects occupy leaf positions in said tree-type data structure, and said determining whether the query plan contains one or more objects that are different from built-in objects comprises searching for objects that are not built-in beginning at said leaf positions.

12. The computer readable product of claim 9, wherein said caching comprises caching a query plan generated by the master node and concerning metadata.

13. A data store system, comprising:

a master node comprising a processor;

a plurality of segment nodes each comprising a respective processor, each node of the data store system comprising a respective processor and a respective non-transitory storage medium, wherein the master node is a query distributing node, and each segment node is a query executing node; and a non-transitory storage medium storing instructions operable to cause the processors to perform operations comprising:

obtaining a query plan by the data store system;

determining, by the data store system, a likelihood of the query plan becoming invalid, comprising:

determining whether the query plan was generated on the master node or on a segment node of the data store system;

upon determining that the query plan was generated on a segment node, designating the likelihood as low; and upon determining that the query plan was generated on the master node, perform action comprising:

determining an estimated complexity value representing complexity of the query plan and designating the query plan as complex or not complex based on the complexity value, wherein more objects being referenced by the query plan correspond to a higher complexity value;

upon designating the query plan as complex, designating the likelihood as high; and upon designating the query plan as not complex, performing actions comprising:

determining whether the query plan contains one or more objects that are different from built-in objects; and upon determining that the query plan contains one or more that are different from built-in objects, designating the likelihood of the query plan becoming invalid as low, otherwise designating the likelihood of the query plan becoming invalid as high; and caching the query plan upon determining that the likelihood of the query plan becoming invalid is low.

14. The system of claim 13, wherein said determining the complexity value is based on a tree-type data structure of the query plan, the tree-type data structure comprising levels and leaves, wherein more levels and leaves correspond to a higher complexity.

15. The system of claim 13, wherein designating the query plan as complex occurs when the complexity is higher than a preselected, user-configurable number.

* * * * *